United States Patent [19]
Suman, Jr. et al.

[11] 3,756,315
[45] Sept. 4, 1973

[54] HYDRATED METAL OXIDE DEPOSITION

[75] Inventors: George O. Suman, Jr.; Edwin A. Richardson, both of Houston; Ronald F. Scheuerman, Bellaire, all of Tex.

[73] Assignee: Shell Oil Company, Houston, Tex.

[22] Filed: Jan. 27, 1972

[21] Appl. No.: 221,401

[52] U.S. Cl................ 166/276, 166/274, 166/281, 166/294
[51] Int. Cl.................. E21b 33/138, E21b 43/04
[58] Field of Search................ 166/292, 274, 294, 166/283, 281, 308, 297, 278; 175/65; 252/8.5 A; 117/95; 106/387 SS; 61/36 R

[56] References Cited
UNITED STATES PATENTS

| | | | |
|---|---|---|---|
| 3,195,630 | 7/1965 | Fisher | 166/292 |
| 3,603,399 | 9/1971 | Reed | 166/292 |
| 3,672,449 | 6/1972 | Richardson et al. | 166/292 |

*Primary Examiner*—Stephen J. Novosad
*Attorney*—Harold L. Denkler and H. W. Coryell

[57] ABSTRACT

A treating liquid for depositing a hydrated metal oxide comprises a basic aqueous solution of an oxide of an amphoteric metal and a pH reducing reactant that subsequently lowers the pH of the solution to one at which a hydrated oxide of the amphoteric metal is precipitated. The treating liquid can provide a single step process for consolidating or plugging a sand and/or can comprise a sand consolidating or plugging component of a drilling, fracturing, perforating, oil-displacing, or the like, type of fluid.

12 Claims, No Drawings

HYDRATED METAL OXIDE DEPOSITION

BACKGROUND OF THE INVENTION

This invention relates to a hydrated metal oxide-depositing treating liquid adapted to consolidate a mass of grains into a permeable (or impermeable) integral structure. It is adapted to be utilized in or in conjunction with drilling, fracturing, perforating, oil-displacing, or the like types of fluids or well drilling or well treating operations. It can also be used to deposit a corrosion resistant and/or catalytic coating of one or more metal oxides.

SUMMARY OF THE INVENTION

The invention relates to a hydrated metal oxide-depositing treating liquid comprising a basic aqueous solution of an amphoteric metal oxide and a pH reducing reactant material that subsequently lowers the pH of the solution to one at which a hydrated metal oxide is precipitated. The amphoteric metal oxide is preferably an amphoteric oxide of aluminum but can be an oxide of one or more metals that are soluble in both acids and bases, such as an oxide of chromium, tin, zinc, arsenic, antimony, or lead, etc. The pH reducing reactant is preferably a relatively slowly hydrolizable ester or amide of a water soluble acid.

The invention relates to a process for consolidating or plugging a permeable granular material by injecting the present treating liquid and precipitating the hydrated metal oxide in situ. It relates to an aqueous drilling fluid having a filtrate comprising the treating liquid and to a process of drilling a borehole while consolidating masses of granular materials (or plugging such materials) on or beyond the walls of the borehole. It relates to a fracturing or perforating fluid having a liquid phase comprising the treating liquid and to a process of fracturing or perforating earth formations while consolidating granular materials on or beyond the walls of the fracture or perforation tunnels. The invention also relates to an oil-displacing surfactant system having an aqueous liquid phase containing the treating liquid and to a well treating process for displacing oil away from the immediate vicinity of a well while consolidating granular materials in the earth formations from which oil is displaced.

DESCRIPTION OF THE INVENTION

The treating liquid of the present invention comprises a relatively high pH (or alkaline or basic) aqueous solution of an amphoteric metal oxide (or water soluble hydroxy complex of the metal) and one or more pH reducing reactant materials. This treating liquid can contain numerous types and proportions of other dissolved or suspended materials as long as such materials do not interfere with the subsequent pH reduction and resultant precipitation of hydrated metal oxide.

The present invention is at least in part premised on a discovery that such a treating liquid (which is typified by such a solution of an alkali metal aluminate) deposits a relatively uniform coating of relatively insoluble, hydrated metal oxide over substantially all contacted surfaces of the solution-confining walls, and does so at a relatively slow rate. Such a behavior of a solution from which a hydrated metal oxide is precipitated is not obvious.

A prior, relatively low pH, hydrated metal oxide-precipitating solution is described in the E. A. Richardson U.S. Pat. No. 3,614,985. It is typified by an acidic aqueous solution in which a metal such as aluminum is dissolved at a relatively low pH and is subsequently precipitated by the action of a pH increasing reactant that is also dissolved in the solution. The prior solution tends to undergo a relatively quickly completed precipitation of particulate hydrated metal oxide (where the concentration of metal is relatively low) or gellation (where the concentration of metal is relatively high). The prior solution and process of precipitating a hydrated metal oxide is particularly useful in selectively reducing the permeability of the most permeable portions of a subterranean earth formation.

The present treating liquid was initially tested as an alkaline (rather than acidic) hydrated metal oxide-precipitating solution expected to effect a similar selective plugging in an acid sensitive earth formation, such as a carbonate reservoir. Unobviously, the expected type of permeability reduction failed to develop. The precipitation process was unexpectedly slow and the sand grains that were coated by the precipitated hydrated metal oxide were interbonded in a relatively strong, permeable, integral structure.

The present treating liquid is typified by an aqueous solution of an alkali metal aluminate such as sodium aluminate. Such an aluminate is relatively soluble at pH's above about 11.5; but, when the pH is gradually lowered, substantially all of the aluminate is precipitated by the time the pH becomes less than about 9.5. For example, in a water solution that is 0.1M in aluminum chloride, 0.5M in sodium hydroxide and 0.5M in formamide and is kept substantially static at 130°F, the pH is gradually reduced by the hydrolysis of the formamide. The pH drops relatively slowly from about 12 to about 10 with the solution remaining clear during the period of about 10 minutes. Precipitation then starts and continues with the pH remaining substantially constant until it begins a slow decrease as the concentration of aluminate becomes very low. The duration of such a deposition of hydrated aluminum hydroxide is about 60 minutes. Such a hydrolysis of formamide removes 1 mole of hydroxide ions for each mole of formamide and the ammonia which is produced by the hydrolysis reaction remains substantially un-ionized at pH's between about 10 and 11.

During such a precipitation reaction, the precipitation is self-induced within each increment of the solution and tends to coat substantially any solid material that is contacted by the solution with the hydrated metal oxide that is being precipitated. The deposition of the metal oxide proceeds layer by layer. In a granular and/or fractured material the layered metal oxide becomes an intergranular cementing material that bonds the adjacent particles to each other. And, as the precipitation continues in relatively small passageways, the coating builds up until the passageways become plugged. The present precipitation process can be utilized to accomplish results such as: consolidating a granular mass; plugging a permeable material; coating substantially any solid material with a layer of a metal oxide that is relatively tightly bonded in place and is adapted to serve as a catalyst, a protective coating (relative to erosion and/or corrosion and/or dissolution by brine) or the like; providing a coating of metal oxide that is a relatively good conductor of heat or electricity compared to the normal conductivities of a subterranean earth formation; or the like.

The concentration of amphoteric metal oxide in the present treating liquid can range from a small but effective amount, such as a 0.05 molar solution of the metal (dissolved in the form of a hydroxy complex of the metal) to an amount that forms a substantially saturated solution. Such a solution can be formed by initially dissolving the metal in the aqueous liquid as its salt of either an acid (e.g. aluminum chloride) or a base (e.g. sodium aluminate). Where the acid salt is dissolved in the aqueous liquid, it can be dissolved at a relatively low pH and the resulting solution can be converted to the solution of the hydroxy complex by adding sufficient alkaline material to increase the pH of the aqueous liquid to one at which the hydroxy complex is soluble. Alternatively, a relatively highly reactive metal such as aluminum can be dissolved in the form of its aluminate by reacting it with a strong alkali such as sodium hydroxide.

The pH reducing reactant material which is used in the present treating liquid can be a compound or mixture that is dissolved in the aqueous liquid solution of amphoteric metal oxide before, during or after the dissolving of the amphoteric metal in that liquid. Preferred pH reducing reactants comprise esters or amides of water soluble acids that hydrolyze at moderate rates at reservoir temperatures in the absence of special catalysts, sensitizers, or the like. Suitable reactants include amides of soluble carboxylic acids, such as formamide, urea, acetamide, dimethyl formamide, 2-chloroacetamide; amides of sulfonic acids, such as methane sulfonamide; inorganic acids amides, such as sulfamide; water soluble esters of water soluble organic acids, such as methyl acetate, methyl gallate, the acetates of alchohols, glycols, or other hydroxy compounds that are normally liquid and are water soluble; water soluble and readily hydrolyzible organic halides, such as sodium trichloracetate, 3-chloropropane, methanesulfonyl chloride, methyl iodide, sodium monochloroacetate, or 3-chloro-1-propanol; etc.

The aqueous liquid in which the components of the present treating liquids are dissolved can comprise substantially any relatively soft water which is compatible with the solutes and the precipitation process, i.e. is compatible with the basic aqueous solution of the amphoteric metal oxide and the pH reducing reactant and the products of the pH reduction reaction. Such aqueous liquids can contain dissolved electrolytes and/or additives, such as water thickeners, surfactants, lubricants, suspended solvents; or the like.

The basicity (or alkalinity) of the present treating liquid can be provided by substantially any water soluble inorganic or organic base or combination of bases that is adapted to provide a pH at which the hydroxy complex of the metal is soluble. The alkali metal hydroxides are preferred bases and can advantageously be used in combination with one or more buffering materials or systems that tend to maintain a pH above the hydrated metal oxide precipitating pH until the buffering components are used up by the pH lowering reaction products of the pH lowering reactants. Examples of suitable buffers include mixtures of sodium carbonate and bicarbonate, mixtures of the polyvalent sodium phosphates, etc.

The concentrations and/or relative proportions of the components of the present treating liquid can be varied relatively widely to enhance various functions or results. In general, the concentration of the amphoteric metal oxide can range from substantially trace amounts to substantially saturated solutions, with the lower concentrations being useful for depositing a thin coating and/or causing a relatively slow build-up of a thick coating as many pore volumes of treating liquid are flowed through or into contact with a material to be treated. The higher concentrations of the oxide deposit a thicker coating on surfaces contacted by less of the treating liquid. The concentration of the alkaline materials and the pH reducing reactant are preferably correlated with the type and concentration of each other and with the type and concentration of the amphoteric metal oxide to provide a subsequent reduction of the pH to one that precipitates the hydrated metal oxide and a time-temperature exposure that is selected for (or is necessary with respect to) initiating the precipitation of the hydrated metal oxide. In general, for a given amphoteric metal oxide concentration and temperature exposure, the precipitation time can be delayed by increasing the concentration of the alkaline material (thus increasing the pH) and/or utilizing buffering materials and/or utilizing a pH reducing reactant material that reacts relatively slowly.

In various situations it may be desirable to filter the present treating liquid just prior to its entry into a permeable material having relatively small passageways such as a tight subterranean reservoir, particularly where the metal content is relatively high and/or the duration or heat of the temperature exposure of the treating liquid is relatively severe. The treating liquid may form a relatively small amount of pre-deposition precipitate before the pH has been lowered to the hydrated metal oxide-depositing pH. In treating a subterranean earth formation, such pre-deposition solids can readily be removed by injecting the treating fluid through a conduit that is provided with a downhole filtering means such as a wire-line retrievable filter.

A treating liquid-forming additive that forms a treating liquid of the present invention when mixed with an aqueous liquid comprises a combination of separate or intermixed components comprising: (a) an amphoteric metal-containing material which is adapted to dissolve in a basic aqueous liquid as a hydroxy complex of the metal, (b) a basic or alkaline material which is adapted to increase the pH of an aqueous liquid to one capable of dissolving the hydroxy complex of the amphoteric metal, and (c) a pH reducing reactant material which is adapted to dissolve in an aqueous liquid and react to lower the pH of the solution to one at which the hydrated oxide of the metal is precipitated. The treating liquid-forming additive can be mixed with (and dissolved in) an aqueous liquid (with the relative proportions of the components properly correlated) in substantially any location or situation in order to provide the present treating liquid (e.g. a basic aqueous solution from which a coating of hydrated metal oxide is subsequently precipitated by the pH reduction that occurs within the solution). Such an additive can be composed of one or more solid or liquid materials which can be dissolved in an aqueous liquid simultaneously or sequentially in order to form a treating liquid of the present invention.

A treating liquid-effected sand consolidating process is provided by the present invention. This is a uniquely effective single step and single fluid treatment which is adapted to accomodate a wide range of conditions such as fluid injection rates and/or treatment zone temperatures. In this process, a permeable mass of grains is consolidated into an integral permeable structure by contacting the grains with the present treating liquid while the hydrated metal oxide is being precipitated. The consolidation can be accomplished by either a static fluid treatment (in which the grains are contacted with a slug of the treatment liquid that remains substantially static in and around the grains while the precipitation is occurring) or by a flowing fluid treatment (in which the treating liquid is flowed through the mass of grains while the precipitation is occurring). This sand consolidating process is particularly advantageous immediately after acidizing a permeable earth formation that is relatively poorly consolidated, in retreating a previously in situ-consolidated earth formation, after the initial completion of a well, following the installation (and/or acidization) of a sand or gravel pack in a well, or the like. The present consolidation process tends to interbond whatever grains are present in the fluid-permeable masses in or around the borehole of a well or permeable earth formation to form permeable intergral or consolidated structure. A well acidizing process in which a slug of acidizing fluid is injected ahead of a slug of the present treating liquid is a uniquely advantageous process for enlarging the pores or fluid passageways within a formation, particularly where the formation is, or is apt to become, unconsolidated.

The present treating liquid is uniquely immune to fluids that may be encountered in a porous mass or reservoir which is to be consolidated. The treating liquid is substantially miscible with (and thus is adapted to displace) substantially any aqueous liquid that is apt to be present. However, as known to those skilled in the art, in an oil-containing subterranean reservoir (with the exception of treatments such as surfactant-aided chemical floods or the like) substantially any aqueous liquid displacement of the reservoir fluid is apt to leave some oil in a residual oil saturation. In a reservoir at a residual oil saturation the oil is present in discreet droplets that are bypassed by an inflowing aqueous solution so that the oil concentration remains substantially unchanged regardless of the number of pore volumes of aqueous solution that flow through the reservoir. With the present sand consolidating process, tests in sand packs have demonstrated that the present treating liquid-effected sand consolidating process is substantially immune to the presence of a residual oil, with respect to forming a consolidated sand pack which is substantially as strong as one formed in the absence of the residual oil.

However, as known to those skilled in the art, if it should be desirable to remove a possibly contaminating or interfering fluid, such as an exceptionally hard water, an oil of high asphaltene or sulfur content or the like, such a contaminating fluid can be displaced away from the region to be treated by injecting one or more oil and/or water miscible liquids in a sequence that leaves the grains to be consolidated permeated with an aqueous liquid that is substantially free of the interfering component.

In a static fluid type of sand consolidation treatment using the present treating liquid, the components of the treating liquid are preferably arranged (primarily by adjusting the pH and the rate at which the pH is lowered) so that the precipitation in each increment of the treating liquid is deferred long enough for substantially all portions of the region being treated to become permeated with the treating liquid before the start of the delayed precipitation of the hydrated metal oxide.

In a flowing fluid type of sand consolidation with the present treating liquid, the components of the treating liquid are preferably arranged (primarily by adjustimg the pH and the rate of pH lowering) so that the precipitation within each increment of the treating liquid begins substantially as soon as the increment has flowed into contact with the grains to be treated and continues while the increment is flowing through the pores within the mass of grains. The permeability-reducing effect of coating the grains as the treating liquid flows through a mass of the grains tends to provide a self-diverting treatment that is particularly advantageous in consolidating an inhomogeneously permeable mass, such as those encountered in a reservoir formation. The self-diverting feature is enhanced by using a relatively high concentration of the amphoteric metal and a relatively rapidly reacting pH lowering reactant in a solution having a pH that is high enough (or is sufficiently buffered) so that the precipitation in each increment is delayed until the increment reaches the grains to be consolidated but then becomes a relatively rapid precipitation. Such a delay can be supplemented and/or replaced by utilizing a relatively slow rate of treatment liquid injection.

In the self-diverting process, the first-arriving increment of the treating liquid coats the walls of substantially the first-entered pores and reduces the permeability of those pores. Since any injected fluid seeks to enter the most permeable openings, the next-arriving increment of treating liquid tends to be diverted into pores that were initially less permeable than those entered by the first-arriving increment. The overall effect is a tendency to force the first-arriving fluid to flow into and deposit a thicker coating within (thus causing a greater reduction in the permeability) the most permeable portions of an inhomogeneously permeable mass of grains. This causes a normalization of the permeability and a uniform distribution of the consolidating treatment throughout the treated zone.

A treating liquid-effected plugging process is provided by this invention. It can be accomplished by flowing the present treating liquid through a permeable material, while the hydrated metal oxide is being deposited from the treating liquid, until the permeability has been reduced by a selected amount. Such a permeability reduction can range from only a few percent to substantially 100 percent of the original permeability. The permeability reduction can also be effected by a static fluid type of treatment, by spotting a slug of the treating liquid in the region to be plugged and allowing it to remain until its metal content has been depleted. If a further reduction in permeability is desired, the depleted treating liquid can be displaced with a slug of undepleted treating liquid, which is then allowed to remain during its precipitation.

A progressively-diverted plugging fluid injection procedure is particularly useful for injecting a solid-depositing fluid into a subterranean zone to be plugged. This procedure comprises: flowing fluid from a source location to a point of entry into the zone to be plugged at a selected rate and pressure that provide a selected rate of inflow into the zone to be plugged; so-flowing a solid-depositing fluid; and, as the permeability is decreased within the zone to be plugged, diverting increasing proportions of the so-flowing solid-depositing fluid away from that zone substantially as required to maintain said selected rate of flow from the source location to the point of entry into the zone to be plugged.

In treating a subterranean earth formation, to plug it by means of the present treating liquid, such a procedure is particularly advantageous in ensuring that substantially all increments of the treating liquid that enter the zone being treated have received the same severity of temperature and time exposure. It causes each increment to start and continue its precipitation for the same length of time after entering the zone being plugged. Each succeeding increment completes its precipitation nearer to the point of entry into the zone than the adjacent preceding increment and the plugging caused by the precipitation from each preceding increment decreases the rate of flow within the zone being plugged. This progressively-diverted fluid injection procedure is useful for treating a subterranean earth formation with substantially any solid-depositing plugging liquid that has a solid depositing time that is affected by the time and temperature exposure of the liquid. For example, this procedure can be used to inject a relatively low pH hydrated metal oxide-precipitating solution of U.S. Pat. No. 3,614,985; an electroless metal plating solution of U.S. Pat. No. 3,393,737; a substantially saturated hot solution of a normally solid solute (such as a sulfur dioxide solution of sulfur) which precipitates the solute when its temperature is reduced to substantially that of the zone to be treated: etc.

The progressively diverted fluid injection procedure can be conducted with equipment that is commonly available at a well site. In a preferred embodiment, an outer tubing string that is provided with a downhole packer is run into the well and the packer is closed, to isolate the zone to be plugged from fluid in the well annulus. An inner tubing string is disposed within the outer tubing string. Fluid initially present in the borehole is circulated out by injecting fluid through the inner tubing string while producing fluid through the outer tubing string, or vice versa. The plugging fluid is injected from a source location to a point of entry into the zone to be treated by pumping it into the inner tubing string at a rate and pressure providing a selected rate of inflow into the zone to be treated. Initially little or no outflow should be allowed through the outer tubing string so that substantially all of the inflowing plugging fluid is forced into the zone to be plugged at the rate and pressure which is established by the pump. As the zone being treated becomes plugged, increasing proportions of fluid are diverted away from the point of entry into the zone being treated, preferably by permitting increasing amounts of fluid to return and flow out of the well through the outer tubing string. As will be apparent to those skilled in the art, such a procedure can be conducted with a single tubing string by using it and the surrounding casing or borehole wall as, respectively, the inner and outer tubing strings.

A treating liquid-containing drilling fluid is provided by the present invention and is adapted to consolidate an earth formation as the formation is being exposed by a borehole being drilled into it. Such a drilling fluid comprises an aqueous drilling mud in which the mud filtrate is the present treating liquid and/or a suspension or solution of drilling fluid components such as bit lubricants, fluid loss controlling materials, shale stabilizing agents, viscosity increasing materials, corrosion inhibitors, etc., in the treating liquid of the present invention. Such drilling fluid components can be substantially any which are suitable for use in an aqueous drilling mud (or low solids or clear drilling fluid) as long as they are compatible with the formation and precipitation of the hydrated metal oxide.

A treating liquid-containing drilling fluid can be formulated by mixing the above described treating liquid-forming additive with substantially any aqueous drilling mud or drilling fluid. This can be done at the well site during the drilling of the well.

The use of a treating liquid-containing drilling fluid is particularly advantageous in drilling through unconsolidated earth formations in or near a reservoir interval. It is often advantageous to use a clear fluid, such as a gas or other fast drilling fluid, or other conventional drilling fluid, in drilling through the overlying earth formations. The drilling fluid filtrate-effected sand consolidation provided by the present invention can convert an unconsolidated interval (such as those common near the Gulf of Mexico) from an interval that requires special completion procedures (such as gravel packs, in situ sand consolidations, or the like) to a reservoir interval comparable (in ease of well completion and stability) to a competent sandstone reservoir.

Where the present filtrate-effected sand consolidation is used during the drilling of a well it may be completed by procedures (such as underbalanced perforation, causing centralization, well-scratching to enhance cementing, or the like) that are conventionally used only in well-cemented sandstone or carbonate reservoirs.

In a treating liquid-containing drilling fluid, the rate of fluid loss (by filtrate penetration into a permeable earth formation) is preferably controlled by a fluid loss-reducing material comprising suspended solid particles that form a filter cake on the face of a permeable earth formation. The proportion of the filter cake-forming particles can be relatively high in order to form a relatively low fluid loss filter cake or can be relatively low in order to permit a relatively high fluid loss or extensive filtrate invasion into a permeable earth formation. The filter cake-forming particles can advantageously be particles that can be subsequently dissolved by a well treating fluid (such as chalk or, other alkaline earth metal carbonate particles, asphalt particles, or the like that can be dissolved by an acidizing fluid or an oil solvent).

A filtrate-effected sand consolidating drilling process is provided by this invention. This process consolidates earth formations while a borehole is drilled into them. It is conducted by drilling while circulating a treating liquid-containing drilling fluid and maintaining the circulating drilling fluid so that treating liquid filtrate invades the earth formation and consolidates masses of grains on and beyond the walls of the borehole. In the treating liquid-containing drilling fluid, the pH reducing reactant can be one which reacts relatively rapidly at the temperature of unconsolidated earth formations to be consolidated as they are encountered by the borehole. The fluid loss properties of such a drilling fluid are preferably adjusted to allow a significant amount of fluid loss into permeable earth formations. Determinations are preferably made of the approximate temperature-time history of an increment of drilling fluid as it circulates from a surface location to the bottom of the borehole and back. The pH of the treating liquid component of the drilling fluid is increased above the precipitation inducing pH by at least substantially the amount that the pH will be reduced by the pH reducing reaction during the travel of an increment of the liquid from the surface to the bottom of the borehole. In the returning increments of the circulating fluid, the addition of the added alkali (to cause such a pH adjustment) tends to redissolve any hydrated metal oxide that was precipitated in the hotter down hole environment. In such a maintenance program, amounts of both the pH reducing reactant material and the amphoteric metal oxide that correspond to those used up by reaction, precipitation, or loss into the earth formations, should be added prior to the re-entry of the drilling fluid into the borehole.

As known to those skilled in the art, the suspended solids such as bit cuttings and the fluid loss material that are contained in a circulating drilling fluid tend to form a relatively low permeability filter cake on the permeable portions of the wall of the borehole. Such filter cakes have a tendency to become thickest along the most permeable portions, into which the fluid flow (filtrate invasion) is the largest. The thickening of the filter cake decreases the rate of filtrate invasion into the earth formations and thus the filter cakes tend to normalize the invasion so that the more permeable portions of earth fomations do not receive proportionately larger amounts of filtrate than the less permeable portions.

A filtrate-effected borehole wall plugging process is provided by this invention. In a filtrate-effected sand consolidating drilling process, the earth-formation-invading treating solution tends to bond the grains within the filter cake to each other and to the grains in the adjacent earth formation. Where desirable, this effect can be utilized to cement the filter cake into a strongly consolidated and relatively impermeable sheath along the borehole wall. Such a cementation can be enhanced by utilizing a relatively high filter loss and/or concentration of amphoteric metal. The pH and rate of pH reduction in the treating liquid is preferably adjusted to cause precipitation to occur in each increment as soon as it reaches the bottom of the borehole.

As indicated above, a treating liquid-effected plugging can be conducted within a mass of grains such as a filter cake and/or adjacent permeable earth formations by simply continuing an inflowing of the treating liquid while it is depositing metal until the metal coating becomes thick enough to cause the plugging. Because of this, it is feasible to concuct a selective wall-plugging and sand-consolidating in the course of drilling a borehole. In various drilling sites, both water sands and oil sands are apt to be present in or near a subterranean reservoir interval. In drilling through a water sand, the plugging effect of the filtrate invasion can be emphasized and/or made predominant. For example, the extent of the plugging can be enhanced by increasing the rate of the hydrated metal oxide deposition and/or the ratio of fluid loss. The rate of deposition can be increased by utilizing a fast-reacting pH reducing reactant. The rate of fluid loss can be increased by lowering the concentration of fluid loss preventing agent and/or increasing the pressure on the drilling fluid in the borehole and/or mechanically agitating the filter cake and/or reducing the weight on the drill bit and/or reciprocating the drill string assembly, or the like. In drilling through an oil sand, the sand consolidating effect with little or no plugging can be emphasized and/or made predominant. For example, this can be enhanced by reducing the concentration of amphoteric metal in the drilling fluid filtrate, reducing the rate of filtrate invasion, e.g., by increasing the concentration of filter loss material, diminishing the time of mechanical agitation of the filter cake by employing an optimum weight on bit to enhance drilling rate, etc. Thus, by drilling while circulating a drilling fluid containing the present treating liquid, the extent of fluid communication between the borehole and the surrounding earth formations can be controlled by adjusting the properties of the circulating drilling fluid to enhance its plugging effects or its consolidating-without-plugging effects and/or by adjusting the extent of fluid loss of the drilling fluid.

In a generally preferred procedure for a drilling fluid filtrate-effected consolidation or plugging of an earth formation, the pH and rate of the pH reduction in the treating liquid component of the drilling fluid are adjusted so that the precipitation of hydrated metal oxide within an increment of filtrate begins substantially as soon as that increment has reached and invaded a permeable portion of the earth formation. As the drilling proceeds and the filtrate invasion continues, the continuing but continually slowing filtrate invasion effects a flowing fluid type of sand consolidation of the mud cake and/or the permeable earth formations. As discussed above, the tendency for the treatment liquid to first flow more extensively into the most permeable pores and (when their permeability is reduced by the deposition of hydrated metal oxide) to be subsequently diverted to pores that were initially the less permeable pores, tends to work in conjunction with the fluid invasion-normalizing tendency of the filter-cake to further insure that at least some sand consolidation is effected in the least permeable portions and not much more is effected in the more permeable portions.

The rate of metal oxide-precipitation and rate of filtrate invasion can readily be adjusted to plug the filter-cake and/or the face (or borehole wall-forming portion) of a relatively poorly consolidated earth formation while consolidating that earth formation without significantly reducing its permeability in regions beyond its face. Before or after the installation and perforation of a borehole casing string, the plugged zone (on or near the face of the earth formation) can be perforated in order to provide a path of fluid communication between the borehole and the consolidated permeable zone within the earth formation. Such a wall plugging with deeper zone consolidation (without plugging) can be utilized to prevent fluid communication between the borehole and a gas or water zone while allowing communication (via an appropriately placed perforation) between the borehole and an oil sand that is adjacent to the gas or water sand.

In a drilling fluid filtrate-effected earth formation consolidation and/or plugging treatment, the time and rate of the precipitation of the hydrated metal oxide is preferably adjusted so that, at the temperature of a poorly consolidated earth formation being drilled, the precipitation in a given increment of the treating liquid starts substantially as soon as that increment reaches the formation and is completed by the time that increment has been displaced into the formation for a selected distance beyond the wall of the borehole. Such a selected distance is preferably not more than about 1 or 2 feet. The rate of filtrate invasion generally involves a relatively slow inflow requiring at least several hours for an increment of the liquid to travel such a distance. In general such a filtrate flow is impeded by a relatively low permeability filter cake through which the formation invading filtrate is displaced in response to a relatively small pressure differential, i.e. the overbalance of the pressure on the fluid in the borehole relative to the pressure on the fluid in the pores of the surrounding reservoir. The concentration of amphoteric metal in the sand consolidating treating liquid filtrate is preferably adjusted to provide a one pore volume treatment that deposits a layer of metal oxide that is strong enough to provide a consolidated formation having selected degree of strength.

The present filtrate-effected sand consolidating drilling process is also useful in situations in which it is desirable to effect a sand consolidation throughout a relatively large zone within a permeable formation as soon as a borehole has been extended into a portion of that formation. For example, in reservoirs near the Gulf of Mexico, the oil bearing sands are apt to comprise relatively thin unconsolidated sand stringers that are sandwiched between substantially impermeable shale sections. In such sand stringers the fluid permeability in both the horizontal and vertical direction is apt to be high. In addition, since such sands are often unconsolidated, substantially any backflowing or producing of fluid from them to the borehole is apt to remove a significant amount of sand. In the present process, when a relatively large zone to be consolidated is encountered, the advancing of the borehole is preferably temporarily interrupted or slowed down in order to increase the rate of filtrate invasion. Where the filtrate is the present treating liquid, the increased rate of filtrate invasion increases the depth and/or degree of sand consolidation.

As known to those skilled in the art the rate of fluid loss through a filter cake is a function of the shear rate of fluid flow along the filter cake. Any action that increases that shear rate will increase the rate of fluid loss or flow through the filter cake. In a well drilling operation such increases can readily be effected by increasing the rate of drilling fluid flow by increasing its pumping rate, increasing the velocity of the flow along the mud cake by positioning a relatively large diameter portion of drill string assembly (such as the drill collars) adjacent to the mud cake, etc. The weight on the bit can be reduced to increase the time of drilling fluid circulation along the filter cake near the bottom of the borehole and the drill string can be reciprocated to increase the mechanical agitation along the surface of the filter cake. Such actions can be used in conjunction with reduction in the filter loss agent concentration and/or increase in the bottomhole pressure of the circulating drilling fluid to enhance the rate and extent of filtrate invasion into the formation to be consolidated.

In a preferred procedure for consolidating a relatively extensive zone, the pH and pH reduction rate of the mud filtrate is adjusted so that in each increment of the filtrate the precipitation of hydrated metal oxide is delayed until the increment has reached and remained for a significant time within the sand to be consolidated. Where desired, the concentration or effectiveness of the filter loss prevention properties of the drilling mud can be reduced to enhance filtrate invasion. A slug of the present treating liquid is preferably injected into the unconsolidated sand stringer in a volume sufficient to consolidate a relatively large region of the sand and allowed to remain substantially static within the sand to effect a static fluid consolidation of the type described above. Where desirable, such an injection can be facilitated by means of downhole packers and/or the application of pressure or a throttling on the outflow of fluid in or out of the annulus around the drill string. After such a treatment the advancing of the borehole can be resumed by means of a filtrate-effected sand consolidating drilling process, or a conventional drilling process. If the sand to be extensively consolidated is relatively thick, e.g. 10 feet or more, and/or the ratio of the vertical to the horizontal permeability is relatively low, e.g. less than one, it may be desirable to repeat such an injection of a slug of such consolidating treatment liquid drilling filtrate into one or more additional depths within the sand.

A sand consolidating fracturing process is provided by the present invention. It is advantageously conducted by incorporating into an aqueous fracturing (or fracture-treating liquid) the treating liquid-forming additive of the present invention (described above), fracturing the earth formation by pressurizing the treating liquid-containing fluid against it to a pressure exceeding the formation breakdown pressure and/or extending a fracture by pumping in portions of such a liquid.

As known to those skilled in the art, in a hydraulic fracturing operation, a fracture is extended by pumping fluid into it faster than fluid leaks through the fracure walls into the pores of the earth formation being fractured. The rate of fluid leakage through the fracture walls is commonly reduced by thickening the fracturing fluid. Granular materials are commonly suspended in fluids which are pumped into the fractures to form permeable fracture propping materials that keep the walls of the fracture apart. Friction reducers, corrosion inhibitors, and various other types of additives are commonly added to the fluids used in forming and/or extending or pumping fluid into a fracture.

in the present sand consolidating fracturing process, the present treating liquid can be incorporated into substantially any of the liquids which are used to initiate, extend, or prop a fracture, as long as those liquids or the components they contain are compatible with the delayed generation of the hydrated metal oxide precipitate. The pH and rate of pH reduction and concentration of amphoteric metal oxide can be adjusted to provide either a flowing fluid or static fluid type of sand consolidation. The deposition of the hydrated metal oxide in each increment of treating liquid is preferably delayed until the increment has entered into the earth formation being treated. This allows the fracturing process to be conducted in substantially a conventional manner, differing only in the inclusion of the treating liquid of the present invention. The resulting fracturing and consolidating process is uniquely advantageous in treating earth formations that are relatively soft and/or unconsolidated, but are relatively impermeable. The present fracturing process ensures that the first or substantially the first liquid which enters the pores of the earth formation is the treating liquid, which is preferably injected while the fluid in the fracture is pressurized to a degree that hydraulically separates the walls of the fracture. The resulting sand consolidation converts the granular materials on and behind the walls of the fracture into an integral, permeable structure that can readily be held apart by fracture propping grains.

A sand consolidating perforating fluid is provided by this invention. It is formed by incorporating into an aqueous liquid the treating liquid-forming additive described above. A perforating process utilizing such a fluid is preferably conducted by displacing the fluid into a portion of the well borehole in which a casing and any surrounding cementing or grouting materials are to be perforated to provide openings or perforation tunnels from the borehole into the surrounding reservoir formation, and perforating the casing, while controlling the fluid pressures within the borehole so that the treating liquid is at least substantially the first fluid to flow through the perforations and into the reservoir. Where desirable, a slug of the present treating liquid can be spotted within the borehole and/or well conduits behind a slug of a perforation cleaning fluid such as an earth formation acidizing fluid and oil solvent, or the like, for removing perforation debris, mud cake, solids, organic solids such as asphalts, asphaltines, etc., and injected immediately behind one or more slugs of such cleaning fluid as, not the first, but substantially the first fluid to be injected into the reservoir.

As known to those skilled in the art, in a casing perforating operation the perforation tunnels are apt to be plugged by materials such as perforation generated debris, suspended solids in the fluids in the borehole, inflowing formation sand grains, or the like, and the plugging of these perforations may severely impair the utility of the well. The equipment and techniques used in commercially available perforating services are commonly designed to prevent or reduce such a plugging. They may provide, for example: a borehole fluid pressure less than the formation fluid pressure, so that as soon as the perforation tunnels are open; fluid backflows from the reservoir to the borehole, to help sweep out such plugging materials; means for forming the perforations while there is a slight overbalance of fluid pressure in the borehole along with means for connecting the perforations to a reduced pressure zone in order to induce a controlled backflow of fluid; etc. In each such arrangement means can be provided for isolating solids entrained in the backflowing fluid from the fluids which will subsequently be injected through the perforation tunnels and into the formation.

The present sand consolidating perforating fluid can advantageously be used in conjunction with substantially any of such conventional types of perforating procedures and/or in conjunction with substantially any of the conventional perforating fluid additives, such as viscosity enhancers, corrosion inhibitors, or the like. The use of the present sand consolidating perforating fluid is uniquely advantageous in causing substantially the first fluid to enter the perforation tunnels and reservoir sand to be the present treating liquid that consolidates any masses of granular materials in or on the walls of the perforation tunnels or in the reservoir sand into integral structures that are stable and permeable.

A sand consolidating oil-displacing fluid is provided by this invention. It is formed by incorporating the treating liquid forming additive described above in the aqueous phase of an oil-displacing surfactant system. Such as oil-displacing fluid is particularly useful in well treatments for reducing permeability impairments due to residual oil and/or emulsions in the immediate vicinity of the well. It can be used either as a well treatment of an injection or production well, as a pre-treatment preceding a fluid drive oil recovery, as the frontal portion of an oil-displacing surfactant system that is injected as an oil-displacing portion of a chemical flood oil recovery process, or the like.

As known to those skilled in the art, highly effective oil-displacing surfactant systems can advantageously be formulated as "active" systems which exhibit an interfacial tension against oil of less than about 0.01 dyne per square centimeter. Such systems can comprise either water-external or oil-external solutions or micellar dispersions of surfactants or surfactants and electrolytes in proportions providing such a high activity. The present sand consolidating oil-displacing systems are preferably active aqueous systems but can also comprise oil-external systems, particularly where the proportion of the aqueous-phase is relatively high.

The present sand consolidating oil-displacing aqueous surfactant system can advantageously be formed by incorporating the treating liquid-forming additive described above in an aqueous solution containing micelles of water-soluble surfactant swollen by amphiphiles of oil-soluble polar organic material, such as those described in U.S. Pat. Nos. 3,330,344 or 3,348,611; or in an aqueous solution of sulfonate surfactants mixed with alkoxylated alcohol sulfate surfactants, such as those described in U.S. Pat. No. 3,508,612; or the like types of aqueous surfactant systems. Such systems can contain thickeners, clay-stabilizing additives, or the like types of additives that are compatible with the hydrated metal oxide precipitation process. In forming such surfactant systems, the amphoteric metal oxide and alkali material can be substituted for equivalent proportions of the electrolytes contained in such surfactant systems.

EXPERIMENTAL EXAMPLES

Table 1 shows the results of laboratory tests on the consolidation of a well-rounded 125 micron sandpack (about 10 Darcy permeability) by flowing multiple pore volumes of the treating solution through the pack at 130°F.

The composition of solution was:
0.1 Molar $AlCl_3$ (present as a soluble hydroxy complex at pH = 11 to 12)
0.5 Molar NaOH
0.5 Molar Formamide This solution remains clear at 130°F for 12 minutes, which is sufficient to allow placement of the solution in the sandpack. The consolidation by deposition of hydrated metal oxide then begins. The solution is depleted in about 10 additional minutes.

Good consolidations were produced by the following multiple treatments (1 pore volume is defined as the pore volume of the consolidated zone in the sandpack).

TABLE 1

| Test Number | No. of Pore Volume Used | Consolidation Profile Estimated Compressive Strength |
|---|---|---|
| 1 | 25 | Inlet >1000 psi decreasing to 0 psi at outlet |
| 2 | 22 | Inlet >1000 psi decreasing to 0 psi at outlet |
| 3 | 16 | Inlet >1000 psi decreasing to 0 psi at outlet |
| 4 | 11 | Inlet >1000 psi decreasing to 0 psi at outlet |

The loss of permeability in the consolidated zone ranged from 10 to 50 percent and was greatest near the inlet. The cementation resisted the action of strong acid at room temperature. The tests indicated that the consolidation occurs as the hydrolysis of the formamide lowers the pH OF the solution containing the soluble $Al(OH)^-_4$ complex. At a critical pH precipitation begins and continues as a layered deposit of $Al_2O_3$-like material is formed on the sand grains and causes the consolidation.

Table 2 shows typical results of tests of the effect of the type and concentration of the components and the temperature of the zone being treated on the time at which precipitation is initiated in the present treating liquid. The pH of such a sodium aluminate solution containing a pH reducing reagent drops relatively slowly until, at a level of about 10, a precipitate becomes visible. The initial precipitation time ($IPT_c$) of various treating formulations were compared by placing a sodium aluminate solution in a container containing a pH meter and adding the pH reducing reactant was at "zero time". The $IPT_c$ was measured as the time required to attain the pH at which precipitation became apparent and which remained substantially constant throughout the deposition of the hydrated metal oxide.

Table 2
$IPT_c$ DATA ON VARIOUS SYSTEMS USING pH RECORDER

| Solution Composition—Moles/l $H_2O$ | | | Temp. (°F) | $IPT_c$ (Minutes) |
|---|---|---|---|---|
| $AlCl_3$ | NaOH | Precipitant | | |
| 0.1 | 0.5 | 1.12-2 chloro ethanol-$\rho$ = 1.2 | 76 | 7 |
| 0.1 | 0.5 | 0.5-2 chloro ethanol-$\rho$ = 1.2 | 76 | 13 to 16 |
| 0.1 | 0.5 | 1.12-2 chloro ethanol-$\rho$ = 1.2 | 130 | 0.85 |
| 0.1 | 0.5 | 0.5-2 chloro ethanol-$\rho$ = 1.2 | 130 | 1.05 |
| 0.1 | 0.5 | 0.4-2 chloro ethanol-$\rho$ = 1.2 | 130 | 1.2 |
| 0.1 | 0.5 | 0.3-2 chloro ethanol-$\rho$ = 1.2 | 130 | 1.6 |
| 0.1 | 0.5 | 0.2-2 chloro ethanol-$\rho$ = 1.2 | 130 | 3.3 |
| 0.1 | 0.5 | 0.8-ethyl acetate-$\rho$ = 0.901 | 130 | 0.56 |
| 0.1 | 0.5 | 0.6-ethyl acetate-$\rho$ = 0.901 | 130 | 0.76 |
| 0.1 | 0.5 | 0.4-ethyl acetate-$\rho$ = 0.901 | 130 | 1.02 |
| 0.1 | 0.5 | 0.2-ethyl acetate-$\rho$ = 0.901 | 130 | 1.96 |
| 0.1 | 0.9 | 0.6-2 chloro ethanol | 130 | ~15 |
| 0.1 | 0.6 | 0.6-2 chloro ethanol | 130 | 1.0 |
| 0.1 | 0.8 | 0.8-2 chloro ethanol | 130 | 1.0 |
| 0.1 | 1.0 | 1.0-2 chloro ethanol | 130 | 1.1 |
| 0.1 | 1.5 | 1.5-2 chloro ethanol | 130 | 3.0 |
| 0.1 | 2.0 | 2.0-2 chloro ethanol | 130 | 27.5 |
| 0.1 | 0.45 | 0.45-2 chloro ethanol | 130 | 1 |
| 0.1 | 0.45 | 0.40-2 chloro ethanol | 130 | 1 |
| 0.05 | 0.3 | 0.3-2 chloro ethanol | 130 | 1.5 |
| 0.05 | 0.3 | 0.2-2 chloro ethanol | 130 | 3.5 |
| 0.05 | 0.3 | 0.1-2 chloro ethanol | 130 | 17.0 |
| 0.075 | 0.4 | 0.4-2 chloro ethanol | 130 | 1.0 |
| 0.15 | 0.7 | 0.55-2 chloro ethanol | 130 | 1.0 |
| 0.2 | 0.9 | 0.6-2 chloro ethanol | 130 | 1.0 |
| 0.3 | 1.3 | 0.7-2 chloro ethanol | 130 | 0.75 |
| 0.4 | 1.7 | 0.8-2 chloro ethanol | 130 | 0.5 |
| 0.1 | 0.5 | 0.5 acetamide | 150 | 155(152)* |
| 0.1 | 0.5 | 0.5 acetamide | 170 | 98 |
| 0.1 | 0.5 | 0.5 acetamide | 190 | 42.5 |
| 0.1 | 0.5 | 0.5 acetamide | 200 | 35 |
| 0.1 | 0.5 | 1.5 acetamide | 190 | 18 |
| 0.1 | 0.5 | 0.5 acetamide | 140 | < 700 |
| 0.1 | 0.5 | 0.5 acetamide | 130 | < 700 |
| 0.15 | 0.7 | 0.55 acetamide | 160 | 103 |
| 0.2 | 0.9 | 0.6 acetamide | 160 | 128 |
| 0.3 | 1.3 | 0.7 acetamide | 160 | 130 |
| 0.4 | 1.7 | 0.8 acetamide | 160 | > several hours |
| 0.5 | 2.1 | 0.9 acetamide | 160 | > several hours |
| 0.15 | 0.7 | 0.55 acetamide | 130 | 316 |
| 0.15 | 0.7 | 0.55 acetamide | 140 | 250 |
| 0.15 | 0.7 | 0.55 acetamide | 150 | 160 |
| 0.15 | 0.7 | 0.55 acetamide | 160 | 103 |
| 0.1 | 0.5 | 0.5 Formamide | 75 | 88.5 |
| 0.1 | 0.5 | 0.5 Formamide | 90 | 62.5 |
| 0.1 | 0.5 | 0.5 Formamide | 110 | 27.5 |
| 0.1 | 0.5 | 0.5 Formamide | 120 | 20 |
| 0.1 | 0.5 | 0.5 Formamide | 140 | 8 |
| 0.1 | 0.5 | 0.5 Formamide | 160 | 5 |
| 0.1 | 0.5 | 0.5 Formamide | 180 | 2.5 |

*Test tube test.

Table 3 shows test data comparing the $IPT_c$ and pH after 24 hours, with respect to a treating liquid containing formamide, and one containing 2-chloroacetamide, as the pH reducing reactants. With the formamide, pH values of less than about 9.7 could not be obtained. This was due to the fact that the liberated ammonia became basic as the pH dropped below 10. At pH values higher than 10, ammonia remains free (un-ionized) and does not contribute to the pH. As the values tends to go lower, the ammonia tends to buffer the system and prevent the lowering. In the chloroacetamide system, however, an additional reaction occurs by the hydrolysis of the chloride and this reaction produces HcL which lowers the pH to 6, as indicated in the table.

Table 3

$IPT_c$ DATA AND pH AFTER 24 Hours

Conditions: 130°F, 0.1 M $AlCl_3$, 0.5 M NaOH

| Precipitant Moles/ $H_2O$ | $IPT_c$ Number | pH after 24 Hrs. |
|---|---|---|
| 0.0 Formamide | Always Clear | 12.0 |
| 0.3 Formamide | 18 | 10.0 |
| 0.5 Formamide | 12 | 9.75 |
| 0.8 Formamide | 8 | 9.7 |
| 0.0 2-Chloroacetamide | Always Clear | 12.1 |
| 0.3 2-Chloroacetamide | 12 | 8.4 |
| 0.5 2-Chloroacetamide | 6 | 6.9 |
| 0.8 2-Chloroacetamide | 4 | 6.0 |

Table 4 shows data obtained from treating liquids in which the amphoteric metal was aluminum that was placed in solution by dissolving a commerically available sodium aluminate. The chemical formula for such a sodium aluminate is commonly indicated as $Na(AlO_2)$ or $Na_2O \cdot Al_2O_3$ or $NaAl(OH)_4$. In Table 4, the amount of sodium hydroxide listed is the amount of excess added for the purpose of adjusting the $IPT_c$. It is apparent that the data followed the trends indicated in the prior test data (with basic solutions of an aluminum oxide obtained by neutralizing aluminum chloride with sodium hydroxide) and the nature of the precipitate developed in the present solutions appears to be identical with that developed in the previously tested solutions.

Table 4

$IPT_c$ WITH Na ALUMINATE

Conditions: 130°F, 0.5 M Formamide/ $HH_2O$

| $Na_2O \cdot Al_2O_3$ (Moles/ $H_2O$) | NaOH (moles/ $H_2O$) | $IPT_c$ (Minutes) |
|---|---|---|
| 0.1 | 0.1 | 11.0 |
| 0.1 | 0.2 | 15.5 |
| 0.1 | 0.3 | 20.5 |
| 0.1 | 0.4 | 37 |
| 0.3 | 0.1 | 7.5 |
| 0.3 | 0.2 | 10.5 |
| 0.3 | 0.3 | 15.5 |
| 0.3 | 0.4 | 17.5 |
| 0.6 | 0.2 | 8 |
| 0.6 | 0.3 | 10.5 |
| 0.6 | 0.4 | 10.5 |

Table 5 shows the results of laboratory tests of sand pack consolidations with treating solutions in which the amphoteric metal is chromium. The solution used was a 0.2 M $CrCl_3$, 4.0 M NaOH, 4.0 M Dimethylformamide, water solution. This solution had an initial precipitation time (IPT) of 12.5 minutes at 85°F. The solution was flowed through sandpacks of No. 5 sand about 1.44 inches in diameter and 24 inches long against a back pressure of 10 psi. The solution was flowed through the packs at about 1.8 cc per minute for the indicated times. A stream of the dimethylformamide was mixed with a stream of an aqueous solution of the chromium and sodium hydroxide just prior to the entry into the sandpack.

Table 5

| Test Number | Temp. (°F) | Time (min) | Fraction of Original Permeability of Pack Retained | Results |
|---|---|---|---|---|
| 1 | 85 | 85 | 0.7* | Good consolidation first 5 cm of pack |
| 2 | 71 | 260 | 0.4 | Entire pack well consolidated as follows: 1) Compressive strength = ~ 10 psi at a distance < 10 cm from inlet 3) Compressive strength = ~ 100 psi at a distance 20 cm from inlet 3) Comparative strength = ~ 10 psi at a distance > 20 cm from inlet |

*A gel formed on the inlet screen on this test which plugged the inlet to approximately 99 percent.

The deposition of a relatively insoluble hydrated metal oxide over substantially all contacted surfaces of the solution-confining walls has been observed in substantially all experiments in which the present treating solutions were flowed through glass or metal conduits (for example in the experiments summarized in Table 1) or confined in containers. Surfaces such as those of sand, glass or stainless steel are coated with a hard scale that is resistant to abrasion or solution in wells, basic or mildly acidic or basic solutions of an aluminum oxide obtained by neutralizing aluminum chloride with sodium hydroxide) and the nature of the precipitate developed in the present solutions appears to be indentical with that developed in the previously tested solutions.

What is claimed is:

1. A sand consolidating well treating process for consolidating granular materials in or around the borehole of a well, comprising:

compounding a hydrated metal oxide-depositing treating liquid comprising a basic aqueous solution of an amphoteric metal oxide and a pH reducing reactant that is adapted to lower the pH of the solution to one at which a hydrated metal oxide is precipitated after a time sufficient for fluid to be pumped from a surface location to a location within the well at which said granular materials are to be consolidated; and pumping said treating liquid into the well so that it contacts said granular material while the hydrated metal oxide is being precipitated.

2. The process of claim 11 in which said amphoteric metal oxide is an aluminum oxide.

3. The process of claim 11 in which:

the pH and rate of pH reduction of said treating liquid is adjusted so that the precipitation within an increment of treating liquid begins substantially as soon as that increment has been pumped into contact with said granular material; and a plurality of increments of said treating liquid are pumped into successive contacts with said granular material.

4. The process of claim 3 in which:

said granular material to be consolidated consists essentially of an unconsolidated reservoir sand encountered by said well; and the depth of penetration of both said treating liquid and said deposition of hydrated metal oxide within the reservoir sand is extended by using a pH reducing reactant material that reacts relatively slowly at the temperature of the reservoir sand.

5. The process of claim 1 in which:

the pH and rate of pH reduction of said treating liquid is adjusted so that the precipitation within each increment of the treating liquid is delayed for a significant time after each increment has been pumped into contact with said granular material; and a slug of said treating liquid is pumped into contact with said granular material and allowed to remain substantially static until the precipitation occurs.

6. The process of claim 1 in which a slug of acidizing fluid is pumped into the well ahead of a slug of said treating liquid.

7. The process of claim 1 in which a slug of a sand or gravel-containing slurry for forming a sand or gravel pack in the well is pumped into the well ahead of a slug of said treating liquid.

8. An earth formation plugging well treating process for plugging an earth formation encountered by the borehole of a well, comprising:

compounding a hydrated metal oxide-depositing treating liquid comprising a basic aqueous solution of an amphoteric metal oxide and a pH reducing reactant that is adapted to lower the pH of the solution to one at which a hydrated metal oxide is precipitated after a time sufficient for fluid to be pumped from a surface location to a location at which said earth formation to be plugged is encountered; and pumping said treating liquid into the well so that the solution is disposed within said earth formation when the hydrated metal oxide is precipitated in an amount sufficient to effect said plugging.

9. The process of claim 16 in which:

said basic aqueous solution is pumped to a point of entry into said earth formation at a selected rate and pressure that provides a selected rate of inflow into the earth formation; and as the permeability of said earth formation is decreased, increasing proportions of said liquid are diverted away from the earth formation, substantially as required to maintain said selected rate of flow between the surface location and the point of entry into the earth formation.

10. A sand consolidating fracturing process, comprising:

hydraulically fracturing a subterranean earth formation;

pumping into said earth formation a treating liquid comprising a basic aqueous solution of an amphoteric metal oxide and a pH reducing reactant adapted to lower the pH of the solution to one at which a hydrated metal oxide is precipitated; and adjusting the pH and rate of pH reduction of said treatment liquid so that the precipitation within each increment of treatment liquid is delayed substantially until that increment has been pumped into said earth formation.

11. A sand consolidating process for perforating a casing in a well borehole, comprising:

displacing a slug of a treating liquid comprising a basic aqueous solution of an amphoteric metal oxide and a pH reducing reactant adapted to lower the pH of the solution to one at which a hydrated metal oxide is precipitated into a cased section of borehole in which the casing is to be perforated;

adjusting the pH and rate of pH reduction of said treating liquid so that the precipitation within each increment of treatment liquid is delayed for a significant time after that increment has been displaced within said cased section of borehole; and perforating said casing while controlling the flow of fluid through the perforations so that said treating liquid is substantially the first fluid to flow from the borehole to the surrounding reservoir.

12. A sand consolidating oil-displacing process, comprising:

compounding an oil-displacing surfactant system containing a liquid phase which is a basic aqueous solution of an amphoteric metal oxide and a pH reducing reactant adapted to lower the pH of the solution to one at which a hydrated metal oxide is precipitated;

displacing the surfactant system into an oil-containing permeable earth formation to displace oil; and adjusting the pH and rate of pH reduction in said aqueous solution so that in each increment of the solution, the precipitation of hydrated metal oxide occurs after said increment has been displaced into said earth formation.

* * * * *

UNITED STATES PATENT OFFICE
CERTIFICATE OF CORRECTION

Patent No. 3,756,315    Dated September 4, 1973

Inventor(s) GEORGE O. SUMAN, JR., EDWIN A. RICHARDSON and RONALD F. SCHEUERMAN.

It is certified that error appears in the above-identified patent and that said Letters Patent are hereby corrected as shown below:

In claim 2, line 1, " 11 " should read -- 1 --.

In claim 3, line 1, " 11 " should read -- 1 --.

In claim 9, line 1, " 16 " should read -- 8 --.

Signed and sealed this 18th day of December 1973.

(SEAL)
Attest:

EDWARD M. FLETCHER, JR.
Attesting Officer

RENE D. TEGTMEYER
Acting Commissioner of Patents